United States Patent Office 3,570,243
Patented Mar. 16, 1971

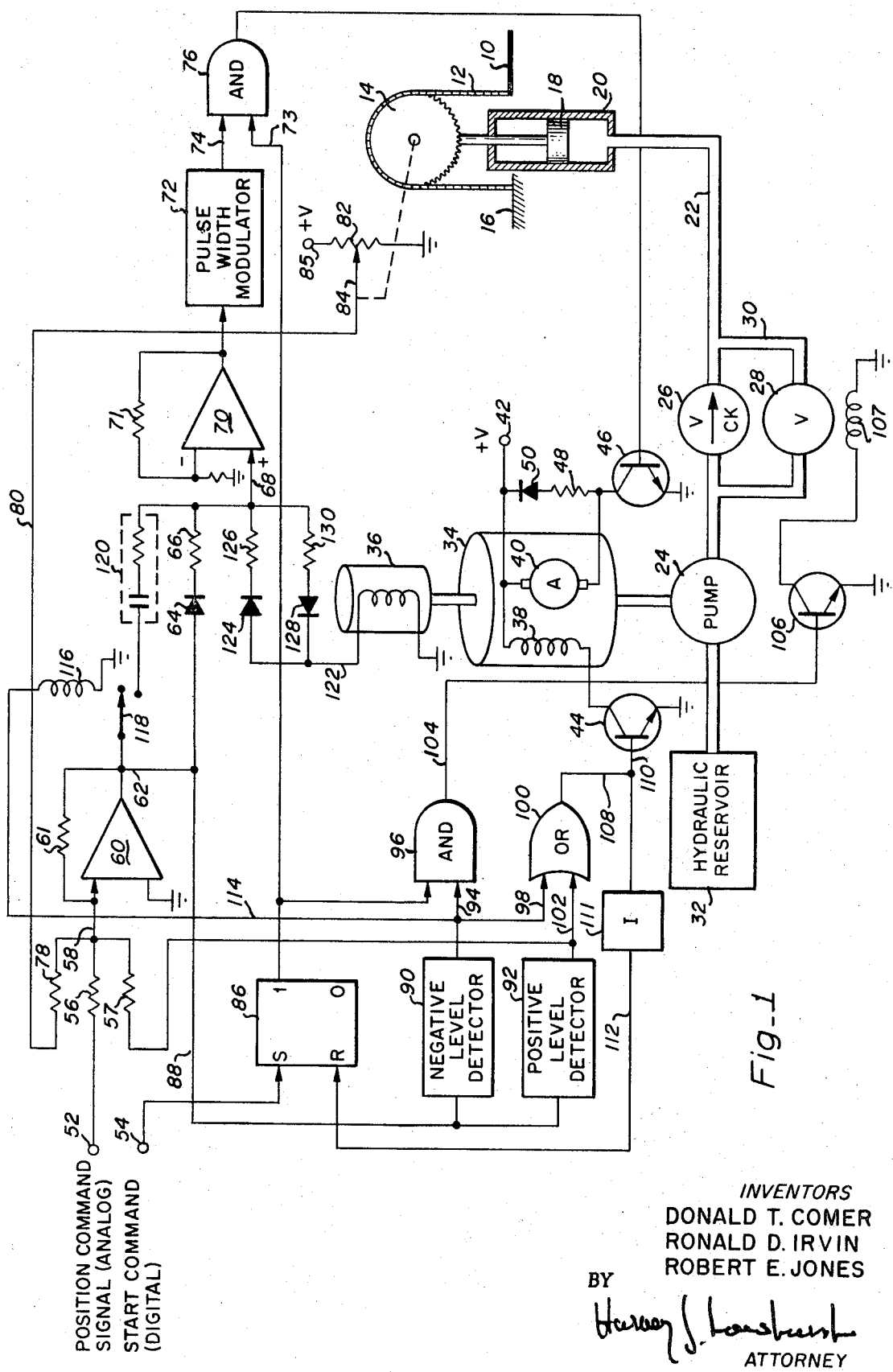
Fig_1

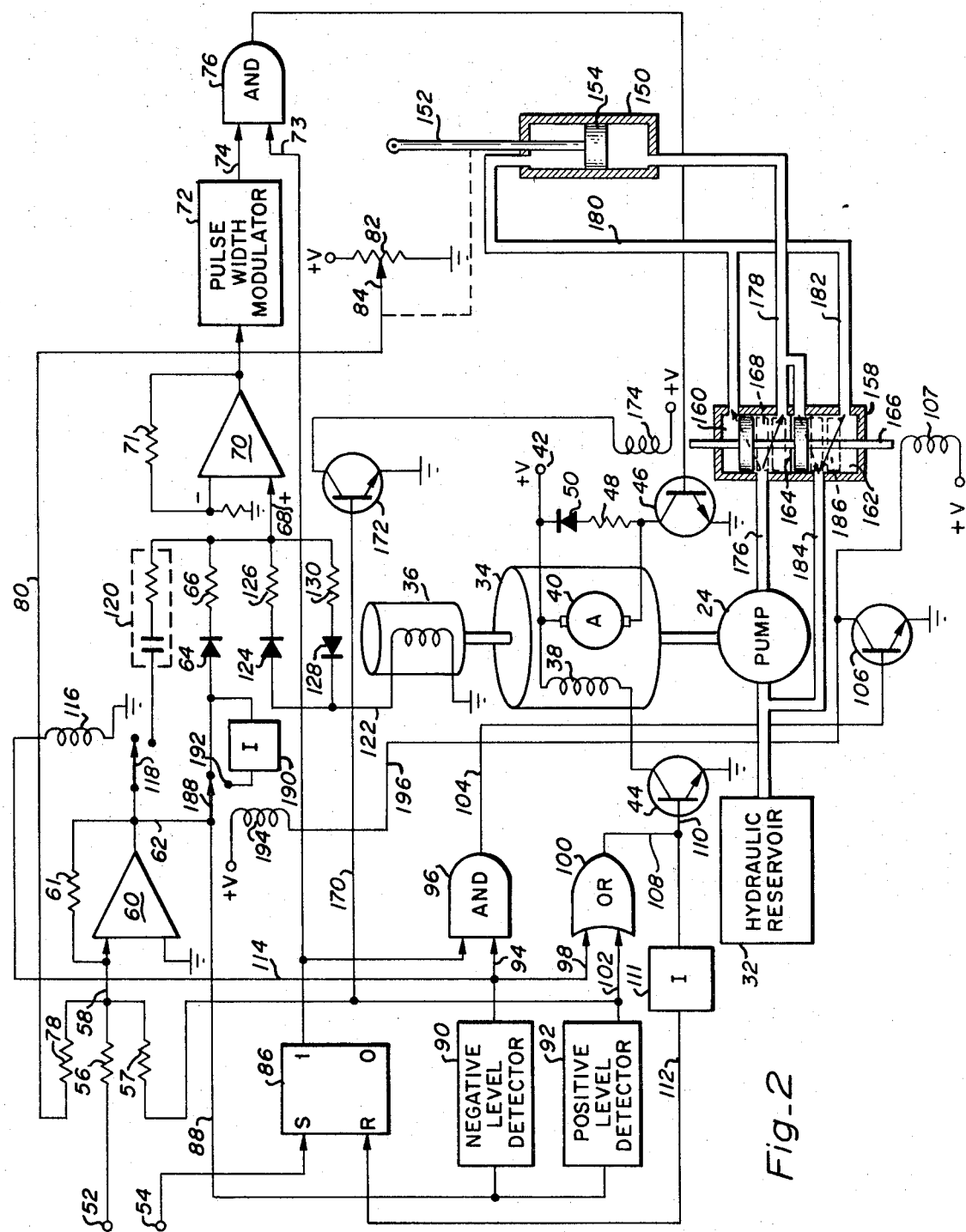
Fig_2

3,570,243
HYDRAULIC ACTUATOR CONTROL SYSTEM
Donald T. Comer and Ronald D. Irvin, Los Gatos, Calif., and Robert E. Jones, Greene, N.Y., assignors to Mobility Systems, Inc., Santa Clara, Calif.
Filed Dec. 9, 1968, Ser. No. 782,026
Int. Cl. F15b *15/18*
U.S. Cl. 60—52
17 Claims

ABSTRACT OF THE DISCLOSURE

A hydraulic control system wherein a positive displacement hydraulic pump means is variably controlled to drive the piston of a hydraulic cylinder to a selected position. The pump means is driven by a shunt-wound DC motor means which is energized in response to the output of an electronic signal generating means which is responsive to the difference between a piston position sense signal and a position command signal. The electronic signal generating means also include an automatic disabling circuit which prevents overshoot and oscillation in the hydraulic cylinder.

BACKGROUND OF THE INVENTION

Hydraulic control systems for use in lift apparatus have been known for quite some time. However, the control systems in most prior art apparatus function by controlling a throttling type valve in the hydraulic system. In such systems, level detection means are typically coupled with a control input to cause the opening of a throttle valve until the lift approaches the desired position. When the lift has nearly reached the desired position, the valve is gradually closed so as to be fully closed when the lift reaches the desired position.

The problems associated with such a control system are well known. For example, conventional hydraulic servosystems require an expensive servo-valve in order to provide proportional control. In addition, a good position feedback signal proportional to lift height is not ordinarily provided by the prior art. Furthermore, conventional systems are not usually compatible with computor or logic control. These and other disadvantages make a throttle valve controlled hydraulic system undesirable for use in many applications.

SUMMARY OF THE INVENTION

The present invention relates generally to hydraulic control systems and more particularly, to an electronic servo-system and hydraulic control mechanism wherein the prime mover of the hydraulic pump apparatus is utilized as a means for simultaneously controlling and providing for the injection or extraction of the hydraulic fluid from the hydraulic actuating mechanism.

Briefly, the present invention utilizes an electronic control system which, in response to an input position command signal and a position indicating signal, causes an hydraulic pump drive apparatus system for lifting a platform or the like, or to be energized in a different manner so as to controllably resist the forcing of fluid from the hydraulic system due to the weight of the platform thereby controlling the lowering thereof. This operation is accomplished in the disclosed preferred embodiment by the use of a shunt-wound DC motor pump driving apparatus which is energized by a pulse-width modulation system driven in response to the operation of several operational amplifiers and associated feedback circuitry apparatus.

The present invention is intended to provide accurate control of the vertical positioning of an hydraulic elevator apparatus, or the like, and has particular utility for use in association with a computor controlled warehouse vehicle. The system, however, is generally applicable to any hydraulic system requiring precise positioning control of an hydraulically actuated mechanism. Although the disclosed system relates specifically to lift apparatus, it is contemplated that the disclosed system can likewise be modified for use in hydraulic systems which do not utilize the force of gravity as the principal means of driving the system in one direction.

A particular advantage of the present invention is that proportional control is achieved in an hydraulic system without the use of a hydraulic servo-valve.

Another advantage of the present invention is that it provides absolute positioning control of a driven vehicle, or the like, in response to a command signal.

Still another advantage of the present invention is that the system is compatible with both manual and digital computor control operation.

Still another advantage of the present invention is that the hydraulic positioning apparatus is controlled by an electric motor driven pump means and its associated control circuitry rather than by a servo-valve, thus providing a more reliable, less expensive system.

It is, therefore, a principal object of the present invention to provide an electronically controlled hydraulic drive system for enabling the precision actuation of a lift mechanism.

Another object of the present invention is to provide a proportional control system for hydraulic lift apparatus which includes a feedback circuit means responsive to the actuation of the controlled apparatus and which enables precision dynamic control thereof.

Still another object of the present invention is to provide a hydraulic lift system wherein the hydraulic pump apparatus is electronically controlled in response to a position command signal and a position sense signal to either inject or extract at a controlled rate actuating fluid from the hydraulic system.

Still another object of the present invention is to provide a precision hydraulic control system which does not require the use of a servo-valve means as the hydraulic control element.

The features of novelty which characterize this invention are pointed out with particularity in the claims annexed to and forming a part of this specification. The invention itself, however, both as to its organization and manner of operation together with further objects and advantages thereof will best be understood upon reference to the following description taken in connection with the accompanying drawing.

IN THE DRAWING

FIG. 1 illustrates a preferred embodiment of a hydraulic lift control system in accordance with the present invention.

FIG. 2 illustrates an alternate embodiment of a hydraulic control system in accordance with the present invention.

DESCRIPTION OF THE PREFERRED EMBODIMENTS

Referring now to the drawing, there is shown a preferred embodiment of a control system in accordance with the present invention. A lift platform 10 is generally shown in the drawing as being connected to one end of a drive cable, or chain, 12 which is passed over a movable pulley 14 and is fixedly connected at its other end to a point 16. The lift platform 10 is typically constrained in movement by guide rails, or the like (not shown) which allow it to move over a predetermined path. The pulley 14 is operatively connected to the actuating piston 18 of a hydraulic cylinder 20 which is actuated by hydraulic fluid introduced thereinto through a conduit 22.

The conduit 22 couples the hydraulic cylinder 20 to a hydraulic pump device 24 through a check valve 26 which allows the pump 24 to supply fluid to the cylinder 20, but prevents the reciprocal flow of fluid therebetween. In order to provide for removal of the fluid from the lower side of cylinder 20, but prevents the reciprocal flow of fluid therebetween. In order to provide for removal of the fluid from the lower side of cylinder 20 as to permit lowering of the platform 10, the check valve 26 is bypassed by an electrically actuable solenoid valve 28 and connecting conduits 30. The valve 28 does not control the movement of the platform 10, but merely serves as an enabling means allowing the platform 10 to be lowered. It is fully closed during upward motion of the platform 10 and fully open during downward motion thereof. As an alternative, the pump 24 can itself be utilized to check the fluid flow between the cylinder 20 and reservoir 32 since it is a positive displacement pump. This is accomplished by providing means for maintaining the motor 34 energized to hold the pump 24 static when the error signal at the output of amplifier 60 is zero. The valves 26 and 28 could thus be eliminated from the fluid path. An hydraulic reservoir 32 is coupled to the pump 24 for providing fluid to the hydraulic system.

The pump 24 is driven by a shunt-wound DC motor 34 which also drives a tachometer generator 36. The DC motor 34 includes a field winding 38 and an armature 40 which are both coupled to an energizing source of potential V at terminal 42. The other side of the field winding 38 and armature 40 are coupled to ground through a pair of electronic switch means 44 and 46 respectively. A load resistor 48 and diode 50 are shunted across the armature 40 of the motor 34 for reasons which will be explained below.

A pair of input terminals 52 and 54 are provided into which the position command and start command signals respectively are applied. The terminal 52 is connected through a resistor 56 to the input 58 of an operational amplifier 60 which includes a feedback resistor 61. The output of the operational amplifier 60 is coupled through a line 62, a diode 64, and a resistance 66 to the positive input 68 of a second operational amplifier 70 which includes a feedback resistor 71. The input is connected to the positive input terminal 68 so as not to cause a sign inversion of the input signal. The output of the operational amplifier 70 is connected to the input of a pulse-width modulator 72, which is coupled to an input 74 of an AND gate 76.

Also coupled to the input 58 of amplifier 60 through a resistance 78 and line 80 is a position responsive input signal which is provided by a lift position potentiometer 82, the wiper 84 of which is operatively coupled to the pulley 14. The position responsive input voltage is obtained from a power supply V connected to terminal 85.

The input terminal 54 is connected through an enabling gate 86 to one of the other inputs 73 of the AND gate 76. The output of the pulse-width modulator 72 will not be allowed to reach the input of the control transistor 46 unless a start command has first been applied to terminal 54. The enabling circuit including enabling gate 86, AND gate 76 AND gate 96, serves as a safety feature for manual operation and makes the system compatible for use with computor control.

Also coupled to the output of the operational amplifier 60 through leads 62 and another lead 88 is a negative level detector 90 and a positive level detector 92. The output of the negative level detector 90 is coupled to one of the inputs 94 of an AND gate 96 and is also coupled to one of the inputs 98 of an OR gate 100. The output of the positive level detector 92 is coupled to the other input 102 of the OR gate 100 and to input 58 through a resistor 57. The output of an AND gate 96 is coupled through a lead 104 to the control electrode of a transistor switch means 106 which actuates the solenoid 107 of valve 28.

The output of the OR gate 100 is coupled through a lead 108 to the control electrode 110 of the transistor switch 44 which closes the field energizing circuit of the motor 34. The output of the OR gate 100 is also connected back to the enabling gate 86 through an inverter 111 and lead 112 for causing the switch 86 to be reset after each relocation of the platform 10 in response to an input position command signal at terminal 52. Thus a start command must be applied to terminal 54 following each position command applied to terminal 52.

In addition to the reasons cited above, another important advantage obtained as a result of using the enable switch 86 in the manner illustrated is that the stability of the system is enhanced. Each time the error signal at the output of amplifier 60 goes to zero, the enable switch 86 is automatically reset. This removes the start command signal from the input of the AND gate 76 and prevents any drive signal from being transmitted to the motor 34. Thus, the possibility of oscillation and overshoot as the platform 10 reaches the desired level is eliminated.

The output of the negative level detector 90 is also connected through a lead 114 to a solenoid 116 which actuates a switch 118 to insert a lead network 120 into the input circuit of the operational amplifier 70 for damping the input thereto when a negative error signal is detected at the output of the amplifier 60. Also connected to the input of the amplifier 70 is the output 122 of the tachometer generator 36. When the output of the tachometer generator 36 is positive, it is applied through a diode 124 and resistance 126 to the input 68 of amplifier 70. When the output of the generator 36 is negative, it is connected to the input 68 through a diode 128 and resistance 130.

In operation, hydraulic pressure for controlling the lift cylinder 20 is provided by the hydraulic pump 24 which is driven by the shunt-wound DC motor 34. The hydraulic pump 24 is of the positive displacement type and may be a vane pump or a gear pump, for example. When the pump 24 is driven in one direction, hydraulic fluid is pumped through the check valve 26 into the hydraulic cylinder 20 causing the piston 18 and pulley 14 to be driven upward, thus raising the platform 10. Under this condition, the hydraulic solenoid valve 28 is closed so that because of the check valve 26 no fluid can leave the cylinder 20 even if motor 34 is completely de-energized. If the solenoid valve 28 is thereafter opened, a path is provided allowing the fluid in the hydraulic cylinder 20 to return through the pump 24 to the reservoir causing the pump 24 to be rotated in the reverse direction if the energy input thereto by motor 34 is insufficient to resist the fluid pressure in line 22.

Assuming the platform 10 is at its lowest position, the position sense signal provided to the input 58 of the summing amplifier 60 by potentiometer 82 will be substantially zero and with no positive command signal input at terminal 52 so output is provided by amplifier 60 and as a result, the motor 34 is not energized. However, upon the input at terminal 52 of a position command signal (a negative voltage for the illustrated system) the sum of the signals appearing at input 58 of amplifier 60 will be negative and will produce a responsive positive output to line 62 in accordance with the normal signal inversion characteristics of the operational amplifier.

The positive output of amplifier 60 is coupled through line 62, diode 64, and resistance 66 to the input 68 of the non-inverting operational amplifier 70. The resulting positive output of the amplifier 70 is fed into the pulse-width modulator 72 which generates a train of output pulses, the widths of which are proportional to the magnitude of the output signal produced by amplifier 70.

If a start command, also referred to as an enabling signal, has not been applied to control terminal 54 so as to actuate enabling line 73, the output of the pulse-width modulator 72 will not be allowed to pass through the AND gate 76 to reach the switching transistor 46 and the motor 34 will not be energized. However, if such a signal has been applied to command terminal 54, the pulse-width modulated control signal at 74 will be passed through the AND gate 76 to turn ON switch 46 at a rate which allows current to flow from the positive source connected to terminal 42 through the armature 40 of the motor 34 and switch 46 to ground. Although the current supplied to the armature 40 may be considered as a pulsed input, the pulse rate is high enough and the impedance characteristics of the armature are such that the armature 40 effectively sees a DC input the level of which is determined by the duty cycle of the pulses input to transistor 46.

The positive output from amplifier 60 is also applied to the positive level detector 92 through line 88 to provide an output signal which passes through the OR gate 100 and line 108 to saturate the base 110 of the transistor 44 and cause the field winding 38 of the motor 34 to be energized. With both field and armature current supplied thereto the motor 34 is energized to drive the hydraulic pump 24 which supplies hydraulic pressure through the check valve 26 to the hydraulic cylinder 20 for raising the platform 10 until the magnitude of the position input (the output of potentiometer 82) equals the magnitude of the command input at terminal 52.

Since the platform 10 will tend to stop at a different place depending on whether it is going up or down due to several factors, such as the compressibility of the hydraulic fluid and the effect of gravity on the direction of travel, in order to anticipate the actual stopping point of the platform 10 when it is going up, a small amount of positive signal is applied to the input 58 of the amplifier 60 from the output of the positive level detector 92 through a resistor 57. This "hysteresis correction" essentially makes the error signal at the output of the amplifier 60 go to zero a little sooner than it ordinarily would, thus, removing the input to the motor 34 at a predetermined time before the platform actually reaches the desired level.

In order to control the speed at which the motor 34 is rotating and thus the rate of hydraulic fluid flow to or from the cylinder 20, the tachometer 36 is adapted to generate an output signal the polarity of which is opposite to that of the position error signal appearing at the output of amplifier 60 so as to reduce the input to the amplifier 70 by an amount dependent on the fluid flow rate and thus the speed of travel of the platform 10.

If the magnitude of the position command signal applied at terminal 52 is less than the magnitude of the actual position signal provided by potentiometer 82 indicating that the command position is lower than the actual position of the platform 10, a positive input proportional to the difference therebetween is applied to amplifier 60 at its input terminal 58. In such a case, the position error signal which appears at the output of amplifier 60 will be negative and will produce an output from amplifier 70 which will cause the pulse-width modulator 72 to reduce the duty cycle of its output to zero and cause transistor switch 46 to be turned OFF so that no armature current is provided to armature 40 of motor 34. However, when the negative level detector 90 detects the negative signal at the output of amplifier 60, it produces an output at 94 which is passed through the AND gate 96 to turn ON transistor switch 106 which opens the solenoid valve 28 to allow the fluid in hydraulic cylinder 20 to be forced back through the pump 24 to the reservoir 32. This causes the pump 24 to now drive the armature of the DC motor 34 in the reverse direction.

Since the negative level detector is also coupled through the OR gate 100 to the base 110 of the transistor switch 44 to maintain it in a conductive state, field current is still supplied to the field winding 38 of the motor 34. Thus, the motor 34 now acts as a generator, the output of which is dissipated through the load resistor 48. The generator action of the motor 34 therefore acts as a braking means to control the rate at which the hydraulic fluid is allowed to pass through the pump 24.

In addition, since the tachometer generator 36 will also be rotated in the reverse direction by the turning of the pump 24, it will generate a positive output which is added together with the negative input to the amplifier 70 to produce a net input thereto which, if it becomes positive due to excessive speed of the descent, will cause the pulse-width modulator 72 to produce an output which turns ON switch 46 to provide armature current to the motor 34. The resulting torque produced in the armature 40 will tend to resist the backward rotation of the armature 40 and tend to slow down the rate at which the hydraulic fluid is passing through the pump 24. Additionally, the output of the negative level detector 90 during descent of the platform 10 causes the solenoid 116 to close the switch 118 to couple a lead network 120 into the input of amplifier 70 to provide a strong deceleration for insuring that the platform is stopped at the time that the error signal goes to zero.

Thus, in accordance with the application of a predetermined voltage input to terminal 52 accompanied by a start command signal applied to terminal 54, the platform 10 can be very accurately positioned at any desired elevation.

Referring now to FIG. 2 of the drawing, an alternate embodiment of the invention is shown wherein the hydraulic cylinder 150 is utilized to drive a reciprocating mechanism via the push-rod 152 and piston 154 in applications where the influence of gravity is substantially the same in either direction or is substantially inconsequential insofar as the operation thereof is concerned.

In this embodiment the fluid pressure supplied by pump 24 must be applicable to either side of the piston 154. At the same time, means must also be provided for returning the fluid from the non-driven side of the piston 154 to the reservoir 32. This is accomplished by means of a double acting, closed center, electrically actuated valve means 158 having a pair of chambers 160 and 162 separated by a partition 164. This type of valve includes a spool 166 which is normally returned by a spring means (not shown) and retained in the mid-position 168 when no actuation is applied thereto. In this position, no flow of fluid is permitted in either direction through either of the chambers 160 or 162. Thus, once the piston 154 is driven to the desired position, the spool 166 will be returned to its center position 168 to cause the piston 154 to be maintained in that position independent of any external forces applied to the push-rod 152.

When a positive error signal is detected at the output of amplifier 60 by the positive level detector 92 indicating that the piston 154 must be driven in the upward direction, the output signal of the positive level detector 92 is applied through line 170 to the base of the transistor 172 driving it to saturation so that current will be allowed to flow through the winding 174 causing the spool 166 to be displaced upwardly into the position shown in the drawing. At this time, the motor 34 is energized in response to the output generated by pulse-width modulator 72 and drives the pump 24 to supply fluid through line 176, chamber 160 of valve 158, and line 178, to the lower side of the hydraulic cylinder 150 causing the piston 154 to be driven upwardly.

At the same time, the fluid in the upper end of the cylinder 150 will be returned to the hydraulic reservoir 32 through the lines 180 and 182, the lower chamber 162 of the valve 158, and line 184. Once the piston 154 has been driven to the desired position, the potentiometer 82 will provide a voltage to the input 58 of amplifier 60 which when combined with the position command signal applied at terminal 52 causes a zero error signal to be produced at the output of amplifier 60. The positive level detector 92 thus produces a zero output which causes transistor 172 to turn OFF and de-energize winding 174 and allow the spool 166 to be returned to its center position 168.

On the other hand, when a position command signal is applied to terminal 52 which causes a negative error signal to be produced at the output of amplifier 60 indicating that the piston 154 must be driven in the downward direction, the negative level detector 90 produces an output which is passed through AND gate 96 and lead 104 to cause the transistor 106 to saturate and complete a current path through the winding 107 which causes the spool 166 of valve 158 to be displaced into its lower position 186 so as to allow fluid to be pumped from the pump 24 through line 176, chamber 160, and line 180 to the upper end of the cylinder 150 for driving the piston 154 in the downward direction. The fluid in the lower portion of cylinder 150 is returned to the hydraulic reservoir 32 through line 178, chamber 162, and line 184.

Since the pump 24 must also be driven at this time by the motor 34 and the system as previously described does not cause an output to be produced by pulse-width modulator 72 when the output of amplifier 60 is negative, a switch means 188 is now provided for directing the negative output of amplifier 60 through an inverter 190 which converts the output signal to a positive signal which can pass through diode 64 and resistor 66 to the input 68 of amplifier 70 for driving the pulse-width modulator 72. The position of the switch 188 is changed to contact 192 from that shown by energization of the winding 194 through lead 196 in response to the saturation of transistor 106 when the negative level detector 90 produces a turn ON signal which is connected to the base of transistor 106 through AND gate 96 and lead 104.

Thus, the motor 34 will be energized to drive the pump 24 until the wiper 84 of potentiometer 82, which senses the position of the push-rod 152, has a voltage impressed thereon which causes the output of amplifier 60 to go to zero. When a zero error signal is obtained at the output of amplifier 60, this indicates that the push-rod 152 has been driven to the new desired position and the spool 166 is allowed to return to its center position 168 so as to maintain the push-rod 152 in that position. It should also be noted here that in addition to the fact that the motor 34 is de-energized as soon as the error signal at the output of amplifier 60 goes to zero, the enable switch 86 will also be reset so as to completely disable the system until a new start command input is applied at terminal 54.

Although many other modifications of the disclosed invention will be apparent to those of skill in the art after having read the above description, it is to be understood that the described systems are for illustrative purposes only and are in no way intended to be of a limiting nature. It is, therefore, intended that the appended claims be interpreted to include all modifications which fall within the true spirit and scope of the invention.

What is claimed is:

1. An hydraulic actuator control system for controlling the displacement of a movable body comprising:
   hydraulic force applying means for displacing said movable body;
   hydraulic pump means operatively coupled to said force applying means for supplying pressurized hydraulic fluid thereto;
   motor means responsive to a first output signal and operative to drive said pump means;
   position sensing means responsive to the position of said movable body and operative to provide a position signal indicative of the position of said movable body; and
   signal generating means having first input terminal means for receiving a command signal and second input terminal means coupled to said position sensing means for receiving said position signal, said signal generating means providing said first output signal responsive to one relationship between said command signal and said position signal.

2. An hydraulic actuator control system as recited in claim 1 wherein said motor means includes a shunt wound DC motor and a first switch means for energizing the armature of said DC motor, said first switch means being responsive to said first output signal.

3. An hydraulic actuator control system as recited in claim 1 wherein said signal generating means further provides a second output signal responsive to another relationship between said command signal and said position signal, and further including a valve means operatively coupling said pump means to said force applying means, said valve means being actuated by said second output signal to permit the return of hydraulic fluid from said force applying means to said pump means.

4. An hydraulic actuator control system as recited in claim 3 wherein said signal generating means further provides a third output signal responsive to said another relationship, and said motor means further including a second switch means responsive to said third output signal for energizing the field winding of said DC motor for causing said motor means to act as an electrical braking means to said pump means when said hydraulic fluid is returned to said pump means.

5. An hydraulic actuator control system as recited in claim 4 and further including a tachometer means operatively coupled to said DC motor for generating a speed control signal for controlling said signal generating means to limit the operational speed of said DC motor.

6. An hydraulic actuator control system as recited in claim 5 wherein said signal generating means further includes an enabling circuit responsive to an enabling input signal, said enabling circuit being operative to prevent energization of said motor means and actuation of said valve means in the absence of an enabling signal.

7. An hydraulic actuator control system as recited in claim 6 and further including a pulse-width modulating means coupled between said signal generating means and said first switch means, said modulating means being operative to control said first switch means in response to said first output signal.

8. An hydraulic actuator control system as recited in claim 2 and further including a pulse-width modulating means coupled between said signal generating means and said first switch means and operative to control said first switch means in response to said first output signal.

9. An hydraulic actuator control system as recited in claim 8 and further including a tachometer means operatively coupled to said DC motor for generating a speed control signal for controlling said signal generating means to limit the operational speed of said DC motor.

10. An hydraulic actuator control system as recited in claim 9 wherein said signal generating means further provides a second output signal responsive to another relationship between said command signal and said position signal, and further including a valve means operatively coupling said pump means to said force applying means, said valve means being actuated by said second output signal to permit the return of hydraulic fluid from said force applying means to said pump means.

11. An hydraulic actuator control system as recited in claim 10 wherein said signal generating means further provides a third output signal responsive to said another relationship, and said motor means further including a second switch means responsive to said third output signal for energizing the field winding of said DC motor for causing said motor means to act as an electrical braking means for said pump means when said hydraulic fluid is returned to said pump means.

12. An hydraulic actuator control system as recited in claim 3 wherein said signal generating means further includes an enabling circuit responsive to an enabling input signal, said enabling circuit being operative to prevent energization of said motor means and actuation of said valve means in the absence of an enabling signal.

13. An hydraulic actuator control system as recited in claim 12 wherein said valve means is a double acting closed-center valve.

14. An hydraulic actuator control system as recited in claim 1 wherein said signal generating means further provides a second output signal responsive to another relationship between said command signal and said position signal, and further including a valve means operatively coupling said pump means to said force applying means, said valve means being actuated by said second output signal to permit the return of hydraulic fluid from said force applying means to said pump means.

15. An hydraulic actuator control system as recited in claim 14 wherein said motor means includes a shunt wound DC motor and a first switch means for energizing the armature of said DC motor, said first switch means being responsive to said first output signal.

16. An hydraulic actuator control system as recited in claim 15 wherein said signal generating means further provides a third output signal responsive to said another relationship, and said motor means further including a second switch means responsive to said third output signal for energizing the field winding of said DC motor for causing said motor means to act as an electrical braking means for said pump means when said hydraulic fluid is returned to said pump means.

17. An hydraulic actuator control system as recited in claim 16 and further including a tachometer means operatively coupled to said DC motor for generating a speed control signal for controlling said signal generating means to limit the operational speed of said DC motor.

References Cited

UNITED STATES PATENTS

| | | | |
|---|---|---|---|
| 2,214,817 | 9/1940 | Harrington | 60—52 |
| 2,977,765 | 4/1961 | Fillmore | 60—52UX |
| 3,141,386 | 7/1964 | Loughridge | 91—361 |
| 3,409,036 | 11/1968 | Sherburne | 60—52X |

EDGAR W. GEOGHEGAN, Primary Examiner

U.S. Cl. X.R.

91—1, 361; 187—28

UNITED STATES PATENT OFFICE
CERTIFICATE OF CORRECTION

Patent No. 3,570,243            Dated    March 16, 1971

Inventor(s) Donald T. Comer & Ronald D. Irvin

It is certified that error appears in the above-identified patent and that said Letters Patent are hereby corrected as shown below:

Column 8, line 11, change "1" to --2--.

Signed and sealed this 19th day of October 1971.

(SEAL)
Attest:

EDWARD M. FLETCHER, JR.      ROBERT GOTTSCHALK
Attesting Officer             Acting Commissioner of Paten